3,573,320
CERTAIN 2-AMINOBENZOTHIAZOLES
Alexander B. A. Jansen, Burnham Bucks., and John Hollowood, Henley-on-Thames, England, assignors to John Wyeth & Brother Limited, Taplow, Maidenhead, England
No Drawing. Filed July 24, 1968, Ser. No. 747,104
Claims priority, application Great Britain, Aug. 8, 1967, 36,337/67
Int. Cl. C07d 91/46
U.S. Cl. 260—305   4 Claims

ABSTRACT OF THE DISCLOSURE

Anilides of the general formula

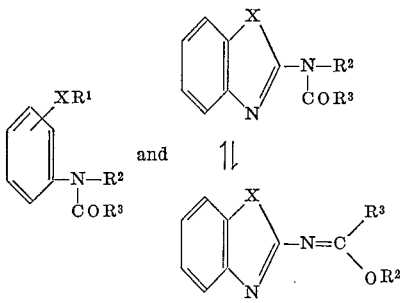

and acid addition salts thereof, in which X is oxygen or sulphur, $R^1$ is a methyl radical with the proviso that, when X is a sulphur atom, $R^1$ is selected from methyl radicals and radicals of the formula

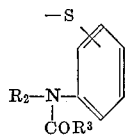

$R^2$ is a

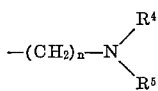

radical where $n$ is a whole number from 2 to 3 and $R^4$ and $R^5$ each represent a hydrogen atom or an alkyl radical or together with the nitrogen atom to which they are attached complete a morpholine, piperidine, pyrrolidine or piperazine ring system, and $R^3$ is an alkyl, aryl, aralkyl or aralkenyl radical, are effective as anti-depressant agents.

---

This invention relates to novel compounds which are substituted anilides or substituted aminobenzoxazoles or substituted aminobenzothiazoles, to a process for the preparation thereof and to pharmaceutical compositions containing such compounds.

The present invention provides compounds of the general formula

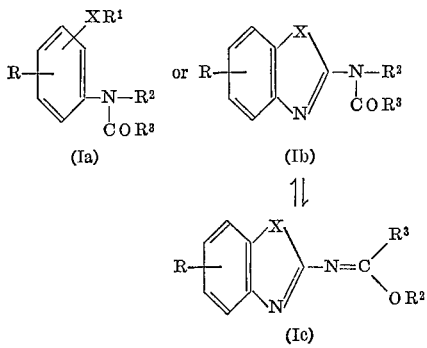

and acid addition and quaternary ammonium salts thereof, in which X is oxygen or sulphur; R is a hydrogen or halogen atom or a nitro, alkyl, alkoxy or haloalkyl radical; $R^1$ is a methyl radical or, when X is a sulphur atom, $R^1$ may be a radical of the formula, $R^2$ is a

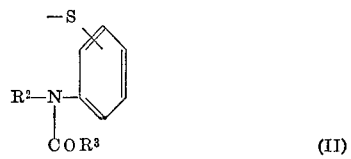

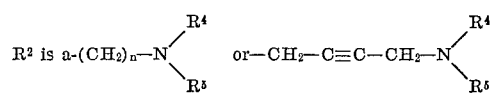

radical where $n$ is a whole number from 1 to 4 and $R^4$ and $R^5$ each represent a hydrogen atom or an alkyl radical or together with the nitrogen atom to which they are attached complate a heterocyclic ring which may contain a further hetero atom and which may be substituted; and $R^3$ is a substituted or unsubstituted alkyl, aryl, aralkyl or aralkenyl radical.

The new ad novel compounds of the present invention possess valuable pharmacological activity. In particular, these compounds in standard pharmacological procedures demonstrated activity on the central nervous system and the cardiovascular system and are useful as antidepressants.

One series of compounds provided by the invention is the series of compounds of the general formula Ia in which $R^1$ is a methyl radical, $R^2$ is a-(CH$_2$)$_n$—N$\begin{smallmatrix}R^4\\R^5\end{smallmatrix}$   or —CH$_2$—C≡C—CH$_2$—N$\begin{smallmatrix}R^4\\R^5\end{smallmatrix}$ radical and —COR$^3$ is an acyl radical which may be an alkanoyl, aroyl, aralkanoyl or aralkenoyl radical and X, R, $n$, $R^4$ and $R^5$ have the meanings defined above. The radical XR$^1$ preferably is in the ortho position to the radical —NR$^2$R$^3$. A second series of compounds provided by the invention is the series of disulphides of the general formula:

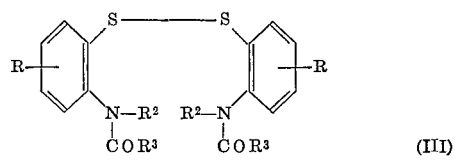

in which $R^2$ is a

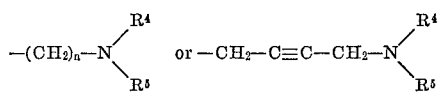

radical, —COR$^3$ is an acyl radical and R, $n$, $R^4$ and $R^5$ have the meanings defined above. A third series of compounds provided by the invention is the series of compounds of the general Formulas Ib and Ic, where X preferably is a sulphur atom. It is to be understood that this series of compounds either have the Formula Ib or the conjugated Formula Ic, depending on which form is the more stable one for a given compound. We have found that when $R^3$ is an alkyl radical in this series of compounds the products generally are of Formula Ib but when $R^3$ is an aryl radical the products are generally of the Formula Ic.

The novel compounds provided by the invention generally may be prepared by reacting an amide of the general formula

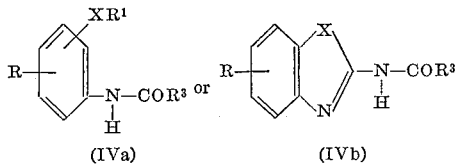

(where R, $R^1$, X and $R^3$ have the meanings defined above) with a compound of the general formula.

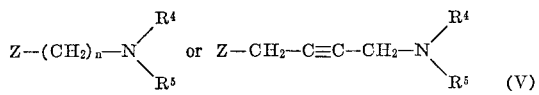

where n, $R^4$ and $R^5$ have the meanings defined above and Z is a halogen atom or an equivalent radical such as an alkyl or aryl sulphonyl radical. The reaction preferably is carried out in solution in an organic solvent (e.g. dimethyl formamide) by forming an alkali metal salt (e.g. the sodium or potassium salt) of the amide of Formula IVa or b and then reacting this salt with the amino alkyl or aminalkynyl halide of Formula V It is also possible to introduce a

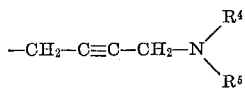

group into a compound of Formula IVa or b by carrying out a Mannich reaction on a compound of the general formula

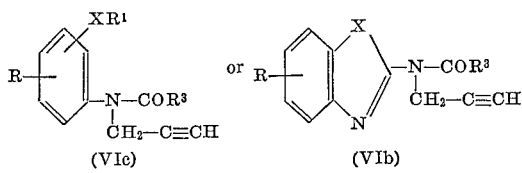

(where R, $R^1$, $R^3$, and X have the meanings defined above) using formaldehyde or paraformaldehyde and the amine of formula

The starting materials of general Formula IVa or IVb, which contain a secondary amido group —NHCOR$^3$, can be prepared by acylating the corresponding compounds, which contain a primary amino group, with an $R^3$ acylating agent for example with the acid chloride of formula $R^3COCl$. The remaining reactants used in the foregoing reactions either are known compounds, which are commercially available or can be prepared by methods known in the art, or are derivatives thereof which can be prepared by well-known chemical procedures from appropriate starting materials following the methods described in the art for the known compounds.

In the compounds of general Formula I, R preferably is a hydrogen atom (i.e. the ring is unsubstituted) or is a halogen atom (e.g. chlorine or bromine), an alkyl radical containing up to 4 carbon atoms (e.g. methyl), an alkoxy radical containing up to 4 carbon atoms (e.g. methoxy), or a haloalkyl radical (e.g. trifluoromethyl). $R^1$ is a methyl radical or, when X is sulphur, $R^1$ can be a radical of Formula II. X preferably is sulphur, but may be oxygen, and the radical —$XR^1$ in compounds of Formula Ia preferably is in the ortho position to the radical —$NR^2R^3$. The value of n in the side chain of $R^2$ preferably is or 3, and $R^4$ and $R^5$, which can be the same or different, each is hydrogen or an alkyl radical containing 1 to 4 carbon atoms (e.g. methyl ethyl or n-propyl), or together form a ring (for example a morpholine, piperidine, pyrrolidine, piperazine, or an N-alkyl or N-aryl piperazine ring, such as an N-methyl or N-phenyl piperazine ring). The radical —$COR^3$ is an acyl radical which may be an alkanoyl (e.g. acetyl or propionyl), aroyl (e.g. benzoyl or substituted benzoyl), aralkanoyl (e.g. phenethoyl) or aralkenoyl (e.g. cinnamoyl).

Acid addition and quaternary ammonium salts of the compounds of general Formulas Ia and b can be prepared by treating the bases with an acid or a quaternising agent. Preferred acids are inorganic acids such as hydrochloric acid and sulphuric acid, and organic acids such as fumaric acid.

The invention also provides a pharmaceutical composition comprising a compound of general Formulas Ia, Ib or Ic or a salt thereof and a pharmaceutically acceptable carrier. Any solid, liquid or cream like carrier known in the art can be used, and the carrier and amount of active material used will depend on the particular compound chosen, and standard pharmaceutical practice. The composition may for example be in the form of a table, capsule, cream or solution.

In the pharmacological evaluation of the properties of the compounds of this invention, the effects in vivo of the compounds are tested in the following tests.

(a) A rat is anaesthetised and the blood pressure, heart rate and respiration are recorded. Blood pressure responses to the injection of epinephrine, actylcholine and histamine are determined before and after administration of each dose of one of the compounds. Nictitating membrane responses to electrical stimulation are also recorded before and after administration. The compounds are injected intravenously in doses of 0.22 and 20 mg./kg. approximately 30 minutes apart. This test measures the hypotensive activity.

The response to the highest drugs are observed for a minimum of two hours.

(b) A compound is administered to three mice at each of the following doses: 400, 127, 40 and 12.7 mg./kg.

The animals are watched for a minimum of two hours during which time signs of general stimulation (i.e. increased spontaneous motor activity hyperactivity on tactile stimulation, twitching), general depression (i.e. decreased spontaneous motor activity, decreased respiration) and autonomic activity (i.e miosis, mydriasis, diarrhea) are noted. The animals are tested for changes in reflexes (i.e. flexor, estensor) and are rated by use of a pole climb and inclined screen for the presence of sedation-ataxia The "Eddy Hot-Plate method" (Nathan B. Eddy and Dorothy Leimbach, J. Pharmacol. Exper. Therap. 107; 385 1953) is used to test for analgesia. The experiment is terminated by subjecting each animal to a maximal electrostock to test for anti-convulsant activity.

Test (b) is for general central nervous system activity.

(c) The anti-depressant activity was measured on septal rats by the method of Brady J. V. and Nauta W. J. H. described in J. Comp. Physiol. and Psychiol., vol. 48, p. 412 (1955).

The compounds of the invention were found to have the activities set out hereinbefore.

When the compounds of this invention are employed as anti-depressant agents they may be administered to warm-blooded animals, e.g., mice, rats, rabbits, dogs, cats, monkeys, etc., alone or in combination with pharmacologically acceptable carriers, the proportion of which is determined by solubility and chemical nature of the compounds chosen route of administration and standard biological practice. For example, they may be administered orally in the form containing such excipients as starch, milk, sugar, and so forth. They may also be administered orally in the form of solutions or they may be injected parenterally. For parenteral administration they may be used in the form of a sterile solution or suspension containing other solutes, for example, enough saline or glucose to make the solution isotonic.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following non-limiting examples illustrate the invention:

EXAMPLE 1 o-Methylthio-N-($\beta$-dimethylaminoethyl)acetanilide o-Methylthioacetanilide (1.84 g.) was added to a suspension of sodium hydride (0.48 g. of a 50% oil dispersion) in 60 ml. of dimethyl formamide (D.M.F.). After stirring at 70° C. for one hour, a solution of $\beta$-dimethylaminoethyl chloride (prepared by neutralising 2.88 g. of the hydrochloride, approx. 0.02 mole) in toluene (30 ml.) was added and the mixture stirred at 50° C. for two hours then allowed to stand overnight.

The mixture was poured into water (200 ml.) and extracted with toluene. The combined toluene extracts were then extracted with dilute (2 N) hydrochloric acid and dried (MgSO$_4$). The combined hydrochloric acid extracts were basified with 10 N sodium hydroxide and the resulting oil extracted with ether. The ethereal extracts were dried (MgSO$_4$) and the ether removed in vacuo on a rotary evaporator to give o-methylthio-N-dimethylaminoethyl-acetanilide as an oil.

The free base was dissolved in the minimum amount of ethanol and ethereal hydrogen chloride added. The mixture was allowed to stand overnight in the refrigerator, to give the hydrochloride of the title compound. Yield (1.4 g., 73%) M.P. 212.5 to 213.5° C.

*Analysis.*—Found (percent): C, 54.2; H, 7.1; N, 9.7; S, 10.9; Cl, 12.25. $C_{13}H_{20}N_2OS \cdot HCl$ (percent) requires: C, 54.2; H, 7.0; N, 9.8; S, 11.2; Cl, 12.35.

EXAMPLE 2 o-Methylthio-N-($\beta$-dimethylaminoethyl)propionanilide

The procedure of Example 1 was followed, but using o-methylthiopropionanilide (1.95 g.), sodium hydride (0.96 g. of a 50% oil dispersion) and $\beta$-dimethylaminoethyl chloride (prepared from 2.9 g. of the hydrochloride) in D.M.F. (60 ml.) to give the title compound as the hydrochloride. Yield (0.8 g., 13.8%) M.P. 157–8° C

*Analysis.*—Found (percent): C, 55.5; H, 7.8; N, 9.1; S, 10.7; Cl, 11.6. $C_{14}H_{22}N_2OS \cdot HCl$ (percent) requires: C, 55.6; H, 7.7; N, 9.3; S, 10.6; Cl, 11.7.

EXAMPLE 3 o-Methylthio-N-($\beta$-dimethylaminoethyl)benzanilide

The procedure of Example 1 was followed, but using o-methylthiobenzanilide (2.4 g.) sodium hydride (0.48 g. as a 50% oil dispersion) and $\beta$-dimethylaminoethyl chloride (prepared from 2.9 g. of the hydrochloride) in D.M.F. (60 ml.) to give the title compound as the hydrochloride monohydrate. Yield (0.4 g.), M.P. 165–6° C.

*Analysis.*—Found (percent) C, 58.7; H, 7.0; N, 7.6; S, 9.0; Cl, 9.5. $C_{18}H_{22}N_2OS \cdot HCl \cdot H_2O$ (percent) requires: C, 58.65; H, 6.85; N, 7.6; S, 8.7; Cl, 9.6.

EXAMPLE 4 o-Methylthio-N-($\beta$-dimethylaminoethyl)phenylacetanilide

The procedure of Example 1 was followed, but using o-methylthiophenylacetanilide (13–6 g.), sodium hydride (0.65 g. of a 50% oil suspension) and $\beta$-dimethylaminoethyl chloride (prepared from 2.9 g. of the hydrochloride. Yield (2.5 g., 49.5%) M.P. 178–180° C.

*Analysis.*—Found (percent): C, 62.2; H, 6.9; N, 7.8; S, 8.6; Cl, 9.8. $C_{19}H_{24}N_2OS \cdot HCl$ (percent) requires: C, 62.5; H, 6.9; N, 7.7; S, 8.8; Cl. 9.7.

EXAMPLE 5 o-Methylthio-N-($\gamma$-dimethylaminopropyl)acetanilide

The procedure of Example 1 was followed, but using o-methylthioacetanilide (2.7 g.) sodium hydride (10.07 g. as a 50% oil dispersion) and $\gamma$-dimethylaminopropyl chloride (approx. 0.03 mole) in D.M.F. (45 ml.) to obtain the title compound as the hydrochloride, M.P. 164–6° C. (Yield 1.0 g., 33.4%).

*Analysis.*—Found (percent) C, 55.7; H, 7.75; N, 9.4; Cl, 11.9; S, 10.5. $C_{14}H_{22}N_2OS \cdot HCl$ (percent) requires: C, 55.7; H, 7.7; N, 9.3; Cl. 11.7; S, 10.6.

EXAMPLE 6 o-Methylthio-N-($\gamma$-dimethylaminopropyl)propionanilide

The procedure of Example 1 was followed but using o-methylthiopropionanilide (1.93 g.), sodium hydride (0.65 g. as a 50% oil dispersion) and $\gamma$-dimethylaminopropyl chloride (from 2.9 g. of the hydrochloride) in D.M.F. (60 ml.) to obtain the title compound as the hydrochloride monohydrate, M.P. 111–114° C. (Yield 1.0 g. 33.4%).

*Analysis.*—Found (percent): C, 53.8; H, 7.8; N, 8.4; S, 9.45; Cl, 10.9. $C_{15}H_{24}N_2OS \cdot CHl \cdot H_2O$ (percent) requires: C, 53.9; H, 7.85; N, 84; S, 9.6; Cl, 10.6.

EXAMPLE 7

N-($\beta$-Dimethylaminoethyl)-o-propionanisidide

The procedure of Example 1 was followed, but using o-propionanisidide (18 g.), sodium hydride (0.48 g. of a 50% oil dispersion) and $\beta$-dimethylaminoethyl chloride (from 2.9 g. of the hydrochloride) in D.M.F. (20 mls.) to obtain the title compound as the hydrochloride. Yield 2.44 g. (85%), M.P. 154–6° C.

*Analysis.*—Found (percent): C, 58.5; H, 8.3; N, 9.6; Cl, 12.5. $C_{14}H_{22}N_2O_2 \cdot HCl$ (percent) required: C, 58.7; H, 8.1; N, 9.8; Cl, 12.4.

EXAMPLE 8

N-[($\beta$-dimethylaminoethyl)]-N-benzoxyl-o-anisidide

The procedure of Example 1 was followed, but using o-benzoylanisidide (4.5 g.) sodium hydride (0.96 g. as a 50% oil dispersion) and $\beta$-dimethylaminoethyl chloride (approx. 0.02 mole) in D.M.F. to obtain the title compound as the hydrochloride. Yield 3.78 g. (57%).

*Analysis.*—Found (percent) C, 63.3; H, 6.9; N, 8.5; Cl, 11.2. $C_{18}H_{22}N_2O_2HCl$ (percent) requires: C, 64.6; H, 6.9; N, 8.4; Cl, 10.6.

EXAMPLE 9

N-[($\gamma$-dimethylaminopropyl)]-N-benzoyl-o-anisidide

The procedure of Example 1 was followed, but using o-benzoylanisidide (5.54 g.), sodium hydride (0.96 as a 50% oil dispersion) and $\gamma$-dimethylaminopropyl chloride (approx. 0.02 mole) in D.M.F. to obtain the title compound as the hydrochloride. Yield 2.7 g. (39%).

*Analysis.*—Found (percent): C, 65.2; H, 7.3; N, 7.9; Cl, 10.1. $C_{19}H_{24}N_2O_2HCl$ (percent) requires: C, 65.4; H, 7.2; N, 8.0; Cl, 10.0.

EXAMPLE 10

2-[N-($\beta$-dimethylaminoethyl)acetamido]benzothiazole

The procedure of Example 1 was followed, but using 2-acetamidobenzothiazole (1.92 g.), sodium hydride (0.48 g. as a 50% oil suspension) and $\beta$-dimethylaminoethyl chloride (approx. 0.02 mole) in D.M.F. (20 mls.) to give the title compound as the hydrochloride. Yield 1.27 g. (83%).

*Analysis.*—Found (percent): C, 51.9; H, 6.15; N, 13.9; S, 10.5; Cl, 12.0. $C_{13}H_{17}N_3OS \cdot HCl$ (percent) requires: C, 52.1; H, 6.1; N, 14.0; S, 10.7; Cl, 11.9.

EXAMPLE 11

β-Dimethylaminoethyl-(N-2'-benzothiazolyl)benzimidate

The procedure of Example 1 was followed, but using 2-benzamidobenzothiazole (2.54 g.), sodium hydride (0.48 g. as a 50% oil suspension), and β-dimethylaminoethyl chloride (approx. 0.02 mole) in D.M.F. to give the title compound (owing to the conjugated form being more stable) as the hydrochloride monohydrate. Yield 2.99 g. (83%).

*Analysis.*—Found (percent): C, 56.9; H, 5.8; N, 11.3; Cl, 9.4; S, 8.3. $C_{18}H_{19}N_3OS \cdot HCl \cdot H_2O$ (percent) requires: C, 56.95; H, 8.85; N, 11.05; Cl. 9.35; S, 8.45.

EXAMPLE 12

γ-Dimethylaminopropyl-(N-2'-benzothiazolyl)benzimidate

The procedure of Example 1 was followed, but using 2-benzamidobenzothiazole (2.54 g.) sodium hydride (0.48 g. as a 50% oil suspension), and γ-dimethylaminopropyl chloride (approx. 0.02 mole) in D.M.F. to give the title compound (owing to the conjugated form being more stable) as the hydrochloride monohydrate. Yield 2.96 g. (79%).

*Analysis.*—Found (percent): C, 57.8; H, 6.15; N, 10.6. $C_{19}H_{21}N_3OS \cdot HCl \cdot H_2O$ (percent) requires: C, 58.0; H, 6.15; N, 10.7.

EXAMPLE 13 p-Methylthio-N-(β-dimethylaminoethyl)acetanilide p-Methylthioaniline (13.9 g.), acetic anhydride (40 ml.) and hydridine (2 ml.) were warmed on a steam bath for 45 minutes, poured into water (500 ml.) and allowed to stand for one hour. The mixture was neutralised with sodium bicarbonate cautiously, extracted into methylene chloride (3 × 100 ml.) and dried over $MgSO_4$. The solvent was removed on a rotary evaporator to leave crystals (12.2 g., 68%) of p-methylthioacetanilide, M.P. 127.8° C.

The procedure of Example 1 was then followed, but using p-methylthioacetanilide (1.81 g.), sodium hydride (0.48 g. as a 50% oil dispersion), β-dimethylaminoethyl chloride (approx. 0.02 mole from 2.9 g. of the hydrochloride) in toluene (20 mls.) to give the title compound as the hydrochloride. Yield 1.7 g. (78%).

*Analysis.*—Found (percent): C, 54.0; H, 7.5; N, 9.7; S, 11.3. $C_{13}H_{20}N_2OS \cdot HCl$ (percent) requires: C, 54.1; H, 7.35; N, 9.7; S, 11.1.

EXAMPLE 14

2,2'-di-[N-(β-dimethylaminoethyl)acetamido]diphenyl disulphide (a) o-aminobenzenethiol (12.5 g., 0.1 mole) was suspended in 0.880 ammonium hydroxide (75 ml.) and air bubbled through for twenty-four hours. The mixture set solid. The yellow solid was filtered off and crystallised from aqueous ethanol to give yellow plates of 2,2'-diaminodiphenyldisulphide, 6.88 g. (55%). M.P. 94–95° C.

(b) 2,2'-diaminodiphenyldisulphide (6.88 g.) was dissolved in acetic anhydride (30 ml.) and pyridine (2 drops) and the mixture then warmed on a steam bath for twenty minutes and then poured into water (150 ml.). The white solid that separated was filtered off and dried. Crystallisation from aqueous acetic acid gave white needles of 2,2'-di-acetaminodiphenyldisulphide, 8.47 g. (92%), M.P. 160–161° C.

(c) Sodium hydride (1.52 g., 0.024 mole of a 50% oil dispersion) was suspended in dimethylforamide (25 ml.) and treated with 2,2'-di-acetaminodiphenyldisulphide (3.32 g., 0.01 mole) dissolved in dimethyl formamide (25 ml.). The mixture was warmed to 70° C. and stirred for two hours, cooled and a solution of β-dimethylaminoethyl chloride (prepared from 3.32 g. (0.03 mole) of the hydrochloride) in toluene (30 ml.) added. The mixture was stirred at room temperature for eighteen hours and then poured into water (300 ml.) extracted with toluene (3 × 100 ml.) the toluene extracts combined and extracted with 2 N hydrochloric acid (3 × 60 ml.). The combined acidic extracts were basified with 10 N sodium hydroxide to give a dark oil. This was extracted with ether (3 × 50 ml.), the ether extracts dried ($MgSO_4$) and the ether removed in vacuo to give 2,2'-di[N-(β-dimethylaminoethyl)-acetamido]diphenyldisulphide as an oil, 1.92 g. (41). The dihydrochloride was prepared in the normal manner and had M.P. 155–157° C. after recrystallisation from isopropyl alcohol.

*Analysis.*—Found (percent): C, 52.7; H, 6.8; N, 10.1; Cl, 13.0; S, 11.6. $C_{24}H_{34}N_4O_2S_2 \cdot 2HCl$ (percent) requires: C, 52.7; H, 6.6; N, 10.2; Cl. 13.0; S, 11.8.

We claim:
1. A compound selected from the group consisting of compounds of the general formula

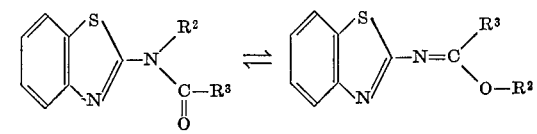

and the pharmaceutically acceptable acid addition salts thereof, in which $R_2$ is a di-(lower alkyl)amino-lower alkyl radical and $R_3$ is selected from the group consisting of lower alkyl and phenyl radicals.

2. A compound according to claim 1, which is 2-[N-(β-dimethylaminoethyl)]acetamidobenzothiazole.

3. A compound according to claim 1 which is β-dimethylaminoethyl-(N-2'-benzothiazolyl)benzimidate.

4. A compound according to claim 1 which is γ-dimethylaminopropyl-(N-2'-benzothiazolyl)benzimidate.

References Cited

UNITED STATES PATENTS 2,851,391  9/1958  Gerjovich et al. _____ 260—305

ALEX MAZEL, Primary Examiner

R. J. GALLAGHER, Assistant Examiner

U.S. Cl. X.R.

260—247.1, 247.5, 268, 293.4, 294.7, 307, 558, 559, 562; 424—248, 250, 267, 270